United States Patent [19]
Gardner

[11] 3,951,057
[45] Apr. 20, 1976

[54] NUT BLANCHING APPARATUS

[76] Inventor: James W. Gardner, 309 Washington Ave., Tyrone, Pa. 16686

[22] Filed: Oct. 21, 1974

[21] Appl. No.: 516,182

[52] U.S. Cl. ................................. 99/629; 74/104; 99/623; 99/628; 141/232
[51] Int. Cl.² .......................................... A23N 5/01
[58] Field of Search ............ 99/623, 628, 629, 630; 74/104; 222/160; 198/53 R; 141/231, 232, 331, 391

[56] References Cited
UNITED STATES PATENTS

| | | | |
|---|---|---|---|
| 2,065,093 | 12/1936 | Rebechini | 99/629 |
| 2,581,321 | 1/1952 | Fletcher | 74/104 |
| 3,196,914 | 7/1965 | Gardner | 99/629 |
| 3,537,489 | 11/1970 | Hall | 141/232 X |

*Primary Examiner*—Robert W. Jenkins
*Assistant Examiner*—James A. Niegowski
*Attorney, Agent, or Firm*—Morse, Altman, Oates & Bello

[57] ABSTRACT

An apparatus is provided for removing the skins from shelled nuts. Nuts such as peanuts are fed into a hopper mounted to a carriage adjustably positioned above a horizontally moving conveyor belt. A plurality of spaced parallel baffles extends diagonally across and slightly above the upper reach of the conveyor with the working faces of the baffles being of an abrasive character. The nuts are fed from the hopper in individual streams between baffles and onto the conveyor where the combined action of the longitudinally moving belt and the diagonally extending fixed baffles will rotate the nuts and move them lengthwise along the baffle to one side of the conveyor, removing the nut skins in the process. The carriage is mounted on a first pair of tracks extending parallel to the baffles with a lead sciew and crank provided for moving the carriage diagonally with respect to the belt in order to dispense the peanuts at different spaced points along the baffles. A second pair of tracks extending lengthwise of the conveyor supports the first set of tracks with another lead screw and crank for moving the carriage and first set of tracks lengthwise for longitudinal adjustment thereof.

6 Claims, 6 Drawing Figures

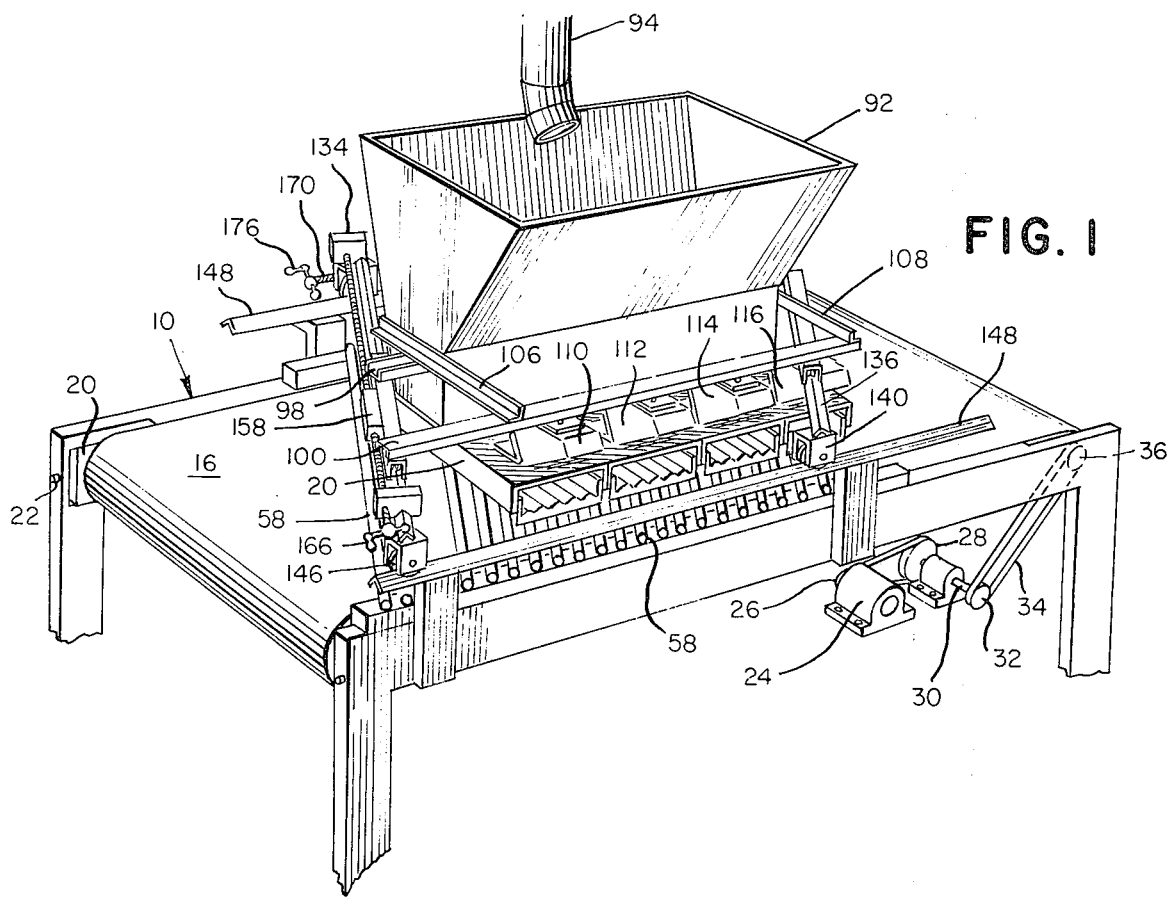
FIG. 1
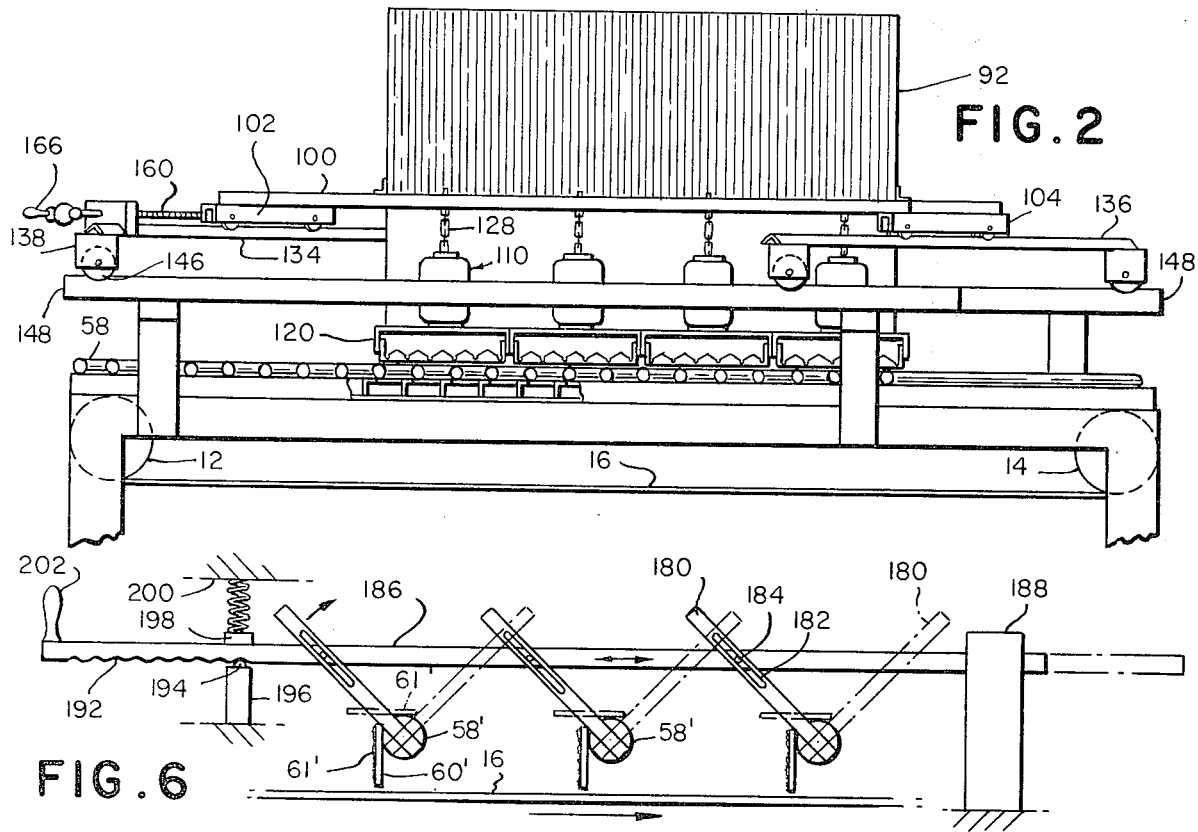
FIG. 2
FIG. 6

U.S. Patent April 20, 1976 Sheet 2 of 2 3,951,057
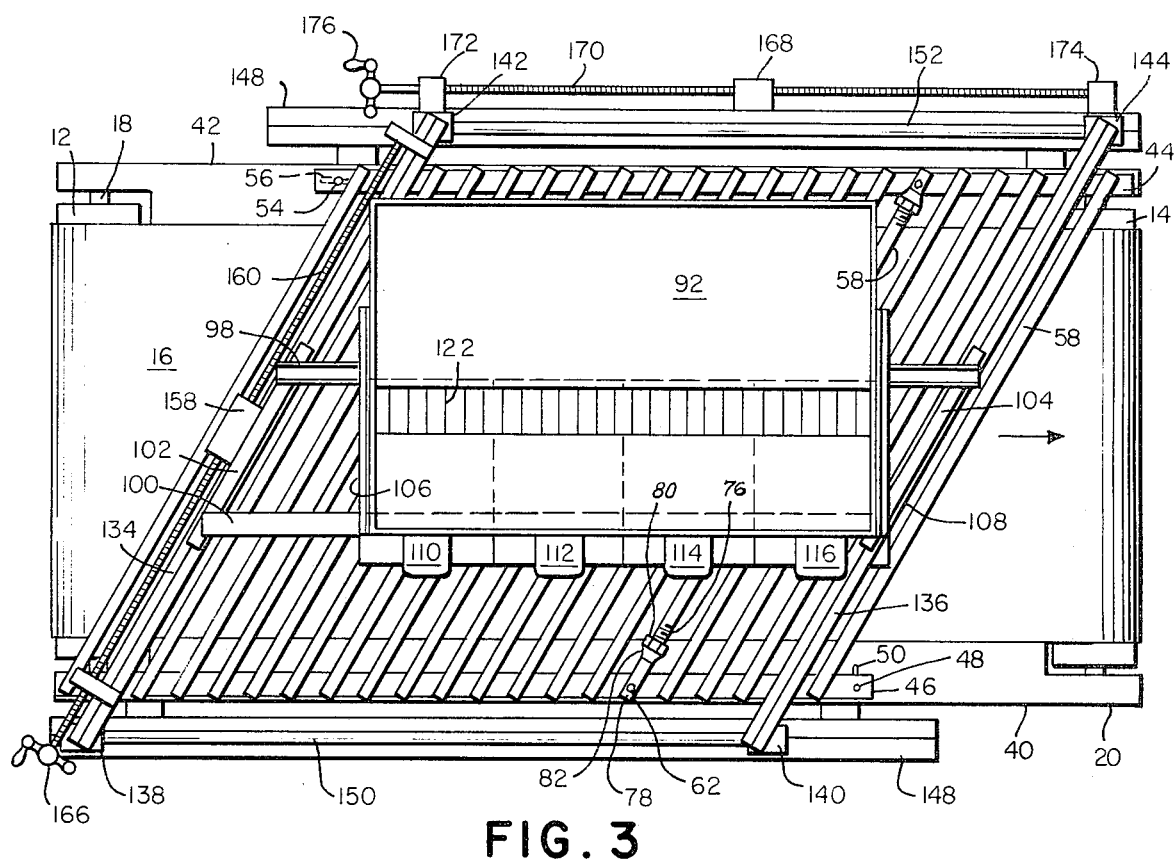
FIG. 3
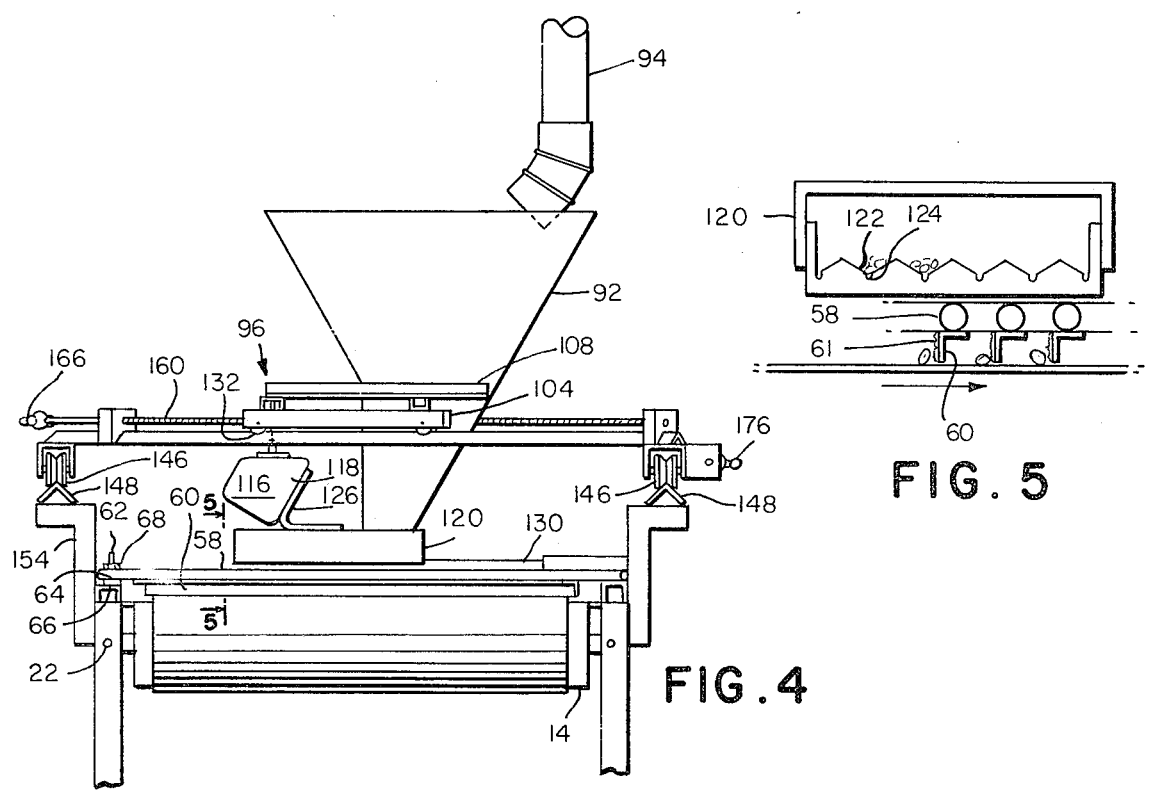
FIG. 4
FIG. 5

NUT BLANCHING APPARATUS

BACKGROUND OF THE INVENTION

1. Field of the Invention

This invention relates generally to apparatus for removing the skins from edible nuts and more particularly is directed towards a nut blanching apparatus of improved adjustability for quicker, more convenient and more accurate setting according to the size, grade, type and condition of the nuts being blanched.

2. Description of the Prior Art

In a great many food products utilizing nuts as an ingredient, blanched nuts are usually preferred. A blanched nut is one in which shelled nuts have their hard, dark outer skins removed. The nuts may be blanched by various techniques and apparatus which include water blanching, as disclosed in U.S. Pat. Nos. 2,558,899 and 2,964,080, or the process may be dry as disclosed in U.S. Pat. Nos. 2,702,574 and 3,196,914. In the latter two patents, the nut skins are first slit as by means of cutters such as shown in U.S. Pat. No. 3,217,764. These cutters form a thin, longitudinal slit along the opposite sides of the nuts to facilitate the subsequent blanching across a moving belt. In practice, the amount of blanching action required to fully remove the nut skins without splitting the nuts will vary from one type of nut to another and will also vary with respect to the size of the nuts and other factors. Excess abrasive action will result in a higher percentage of splits while insufficient abrasive action will produce incomplete blanching. Thus, the blanching apparatus should be adjustable to vary the parameters of the blanching action.

Accordingly, it is an object of the present invention to provide improvements in the adjustment of the blanching mechanism over the apparatus of the sort shown in U.S. Pat. No. 3,196,914. Another object of this invention is to provide a high speed nut blanching apparatus adapted to remove all of the outer skins of nuts with a minimum number of splits. A further object of this invention is to provide a high speed nut blanching apparatus having a wide range of convenient adjustments to accommodate nuts in the wide range of sizes, grades, types and condition.

SUMMARY OF THE INVENTION

This invention features an apparatus for blanching edible nuts wherein nuts which have had their outer shells removed are fed onto a moving belt which carries the nuts against a plurality of spaced parallel baffles extending diagonally across and closely above the upper reach of the belt. The baffles are abrasively faced to remove the skins of the nuts as they are carried along. The apparatus includes a carriage supporting a plurality of vibrating feeders dispensing nuts from a common hopper in individual streams between the baffles. The carriage is provided with rollers riding on a first set of tracks which extend diagonally with respect to the conveyor and parallel to the baffles. A lead screw and crank permit the carriage to be moved to any dispensing point with respect to the length of the baffles. A second set of tracks supports the first track set and extends parallel to the length of the belt. The first set of tracks is provided with rollers which ride on the second set of tracks and a lead screw and crank provide means for adjusting the carriage and the first set of tracks longitudinally with respect to the baffles to provide a full range of adjustment.

BRIEF DESCRIPTION OF THE DRAWINGS

FIG. 1 is a view in perspective of a nut blanching apparatus made according to the invention, FIG. 2 is a view in side elevation thereof, FIG. 3 is a top plan view thereof, FIG. 4 is a view in end elevation thereof, FIG. 5 is a sectional view along the line 5—5 of FIG. 4, and, FIG. 6 is a detail side view of a modification of the invention.

DETAILED DESCRIPTION OF THE PREFERRED EMBODIMENT

The nut blanching apparatus disclosed herein is used in the blanching of edible nuts especially peanuts. The blanching apparatus may be used in conjunction with other equipment and preferably the peanuts which are passed through the apparatus first have had their outer shells removed and fed through a skin-slitting apparatus such as shown in my U.S. Pat. No. 3,217,764.

In the above patent the nuts are carried individually between a pair of spaced opposing knife edges which slit the skins on opposite sides of each nut from end to end. Once the slits have been made in the skins, the nuts are transferred to a drying or dehydrating chamber where a continuous flow of dehumidified air is circulated over and around the nuts so as to dry their skins. This drying process causes the skins to start peeling away from the nut along the slits. Once the skins have started to peel, the nuts are fed onto a blanching apparatus disclosed herein.

Referring now to the drawings, the nut blanching apparatus is generally organized about an upright table which has mounted at the top thereof and at either end rollers 12 and 14 about which is looped an endless conveyor belt 16. The belt 16 may have a width of 35 inches, for example, with a substantially flat horizontal upper reach of 6 feet or so in length. These dimensions are not critical and may be increased or decreased according to the operating capacity desired for the machine. The belt surface employed in the illustrated embodiment should be of a frictional characteristic preferably being fabricated from reinforced rubber or other suitable material and preferably being formed with a number of very small, closely spaced protuberances such as truncated pyramids or cones to provide an efficient frictional surface for moving peanuts along the belt in the direction indicated by the arrow in FIGS. 1 and 3. The rollers 12 and 14 typically are on the order of perhaps 6 inches in diameter and 37 inches or so in length with their arbors 18 supported at their ends in bearing blocks 20. Preferably, the blocks are adjustable lengthwise of the table 10 by means of screws 22 whereby the belt may be properly tensioned and the two rollers aligned in true parallel relation for proper tracking of the belt.

The upper reach of the belt 16 is fully supported throughout its length and width by an underlying panel (not shown) which provides a smooth and flat support for the belt as it travels between the rollers. The belt is moved by means of a variable speed motor 24 mounted below the belt and driving the roller 14 by means of connected pulleys 26 and 28 which drive a shaft 30 carrying a gear 32 in mesh with a chain 34. The chain is looped about a sprocket gear 36 mounted on the end of the shaft supporting the roller 14.

Mounted to the table 10 and extending lengthwise thereof on opposite sides of the belt is a pair of horizontal supports 40 and 42. Each of these supports carries an inverted channel member 44 and 46 with the member 46 being mounted for lateral adjustment by means of a bolt 48 passing through lateral slots formed in the support 40. The channel member 44, on the other hand, is mounted for longitudinal adjustment on the member 42 by means of bolts 54 passing through longitudinal slots 56. Extending diagonally across the belt is a plurality of parallel abutments in the form of elongated, rigid tubes 58 each carrying a flat elongated depending baffle 60 attached lengthwise thereto. In practice, the leading face of each baffle is of a somewhat abrasive nature typically the abrasive facing being provided by a ply of grit sheet material 61 applied thereto or a strip of roughened metal similar to the surface of a rasp may be provided. In either event, the abrasive face of the baffle in conjunction with the frictional moving belt will cause peanuts that are fed between the parallel baffles to be trapped and rolled diagonally across the belt and longitudinally along the face of the baffle, effectively removing the skin from the nut.

The opposite ends of the tubes 58 are mounted on the channel members 44 and 46 by means of vertical pins 62 spaced evenly along the top surface of each member. Each of the pins is threaded and provided with two lower nuts 64 and 66 with a third nut 68 attached to the upper end of the pin 62 for clamping the end of the tube in place. It will be understood that by properly rotating the nuts 64, 66 and 68 the effective height of the tubes 58 may be adjusted relative to the top surface of the belt 16. It will also be appreciated that the agular position of the tubes across the belt 16 may be varied by loosening the bolts 48 and 54 and manually shifting the member 46 laterally and the member 52 longitudinally until the desired angle of the tubes 58 is achieved. By mounting the tubes on the pins 62 all of the abutments with their baffles 60, which in a typical machine may be on the order of two dozen in number, extending parallel to one another, may be adjusted simultaneously. Once the proper setting has been reached, the bolts 48 and 54 are again tightened to clamp the channel members 44 and 46 firmly against the supports.

It will be noted in FIG. 4 that the baffles 60 along one side of the machine do not extend the entire width of the belt 16 but rather terminate two or more inches from the edge of the belt so that nuts fed onto the belt between each of the abutments will be moved forwardly and to the right as viewed in FIG. 4 or upwardly as viewed in FIG. 3. The nuts fed in a stream between each pair of baffles will roll along the face of the baffle towards the side of the belt with the abrasive action of the baffle removing the skin. If deposited at the proper point on the belt, by the time the nuts reach the end of the baffle, all of the skins will have been removed and the nuts fed out onto the unbaffled portion of the belt will move in a straight line forwardly over the end of the belt or to another conveyor where the nuts may be carried to further processing such as roasting or the like.

As best shown in FIG. 3, the baffles are mounted for rotary adjustment about the longitudinal axis of the tube whereby the abrasive nut engaging faces of the baffles may be arranged to define a selected angle with respect to the belt 16. Typically, the angle is acute although the baffle may be set with the abrasive face in the vertical plane. It will be understood that nuts traveling along with the moving belt will be trapped between the baffle and the belt and will be rolled along lengthwise of the baffle and diagonally of the belt towards the upper or discharge side of the belt as shown in FIG. 3. Depending upon the size and the character of the nuts that are being blanched, as well as other factors, the baffles may be adjusted to whatever angle produces the quickest and most efficient blanching action without splitting the nuts. Ideally, the nuts are blanched only long enough to remove their skin and no longer, since excessive engagement between the nuts and the baffles will only remove nut meat and tend to increase the chance of splitting. Insufficient blanching action will result in incomplete removal of the skins.

As illustrated in FIG. 3, each end of each abutment tube 58 is threaded at 76 and received in the tapped end of a sleeve 78 which is pivotally mounted about a vertical axis at the pin 62. The threaded end of the tube 58 is also provided with a jamb nut 80 which, when backed off, will permit the tube to be rotated 360° about its longitudinal axis. When the selected angular position is reached, the jamb nut 80 is tightened up against a nut head 82 formed on the inner end of the sleeve 78 thereby locking the tube in position. It will be appreciated that while both ends of the abutments may be tightened in the desired angular position for maximum rigidity, sufficient positioning may be obtained by merely locking one end of the abutment. By providing a full 360° adjustment, the frictional surface of the baffle 60 may be raised to a horizontal position to permit periodic cleaning as well as replacement of abrasive material.

The peanuts are delivered onto the belt 16 from an overhead carriage generally indicated by reference character 90 and including a hopper 92 fed by means of a pipe 94 at a rate sufficient to keep the hopper 92 substantially filled at all times. The carriage 90 includes a rigid frame 96 comprised of parallel longitudinal frame members 98 and 100 connected at their ends by diagonally extending parallel end frames members 102 and 104. The hopper 92 is mounted to the carriage frame 96 by means of cross supports 106, 108 from which is suspended a battery of vibratory feeders 110, 112, 114 and 116. Each vibratory feeder includes a motor 118 drivingly connected to a feeder box 120 suspended therefrom. The box 120 has one end thereof positioned under the hopper 92 to receive nuts therefrom whereas at the opposite end is positioned over the abutments so that, when acutated, the vibratory feeder will dispense the nuts from the hopper onto the belt 16. Each box 120, as best shown in FIG. 5, is formed with a plurality of spaced parallel channels 122, typically V-shaped and spaced apart by a distance corresponding to the spacing between adjacent abutments so that, when properly positioned over the abutments, the nuts will be fed from the box in parallel streams, one stream deposited in front of the baffle. The channels 122 may be formed at their bases with grooves 124 of semi-circular cross-section large enough to accommodate a row of peanuts in single line. This configuration further aids in the feeding and formation of a stream of nuts from the box onto the belt.

Each feed box 120 is attached to its vibrator motor 118 by means of an angle bracket 126 all of which are suspended by links 128 from the carriage 96 whenever the carriage is moved, the hopper 92 together with all of the vibratory feeders and boxes 120 are moved along with it. The hopper 92 is relatively large and delivers nuts into all of the feeder boxes. The upper opening of the hoppers is sufficiently large that the carriage may be moved throughout its adjustment range and still receive nuts from the filling pipe 94.

Because the nuts are quite light in weight, some of the nuts may tend to bounce about as the result of the fast moving belt carrying them against the fixed baffles. In order to contain the nuts between adjacent baffles, a telescopic shield 130 is provided between the box 120 and the side of the conveyor table. The shields are positioned on top of the baffles and are comprised of two or more sections adapted to slide with respect to another, telescoping according to the position of the carriage.

The carriage 96 is provided with rollers 132 at both ends of the frame members 102 and 104, the rollers being formed with annular V grooves which ride on the top of a pair of diagonally extending parallel rails 134 and 136. The rails 134 and 136 typically are inverted angle irons, extending in spaced horizontal relation above the belt and supported at their ends by means of inverted channel supports 138, 140, 142 and 144. Each of the channel supports carries a roller 146 similar to that of the rollers 132 having annular V-grooves to ride upon longitudinally extending rails 148 in the form of inverted angle irons. The supports 142 and 144 are also in pairs connected by a tie rod 152. The rails 148 extend along both sides of the belt and are mounted in a raised position by means of vertical frame members 154 and 156 both fastened to the sides of the table.

The carriage frame member 102 carries a follower 158 to which is threaded a lead screw 160 extending in spaced relation to the rail 134 and rotatably supported at its end by bearings 162 and 164. A crank handle 166 is provided at the end of the lead screw by which it may be turned and thereby cause the carriage 96 to be moved diagonally with respect to the conveyor belt and parallel to the baffles 61. Similarly, the rail 152 is provided with a follower 168 threaded to a lead screw 170 the ends of which are supported by bearing blocks 172 and 174 mounted to the supports 142 and 144. A hand crank 176 is provided at one end of the lead screw by which the lead screw may be turned to move the assembly comprised of the supports 138 through 144 together with the connecting rods 150 and 152 rails 134 and 136 and the carriage 96 in a direction longitudinal of the belt. Thus, manipulation of the lead screws 160 and 170 provides a convenient double-coordinate adjustment capability which may be carried out quickly and easily in order to adjust the dispensing position of the boxes with respect to the baffles, allowing each machine to be adjusted for the optimum blanching action according to the size, grade, type and condition of the nuts being processed.

Referring now to FIG. 6 of the drawings there is illustrated a modification of the invention and, in this embodiment, all of the tubes 58' and their attached baffles 60' are mounted for simultaneous angular adjustment about their horizontal axes. This arrangement is particularly useful for periodic cleaning of the abrasive faces 61' insofar as individual manipulation of each tube and baffle is eliminated. In the FIG. 6 embodiment, each tube 58' is rotatably mounted and provided at one end with a lever arm 180 fixed thereto and extending upwardly and therefrom. The arm 180 is formed with a slot 182 in which rides a pin 184 extending from the side of a shipping rod 186. The shipping rod is mounted to the frame of the apparatus extending horizontally along one side of the table parallel to the belt. One end of the rod 186 is supported for sliding movement to a block 188 while the opposite end is supported by an indexing mechanism 190. The indexing arrangement includes a plurality of spaced indents or teeth 192 formed along the lower edge of the shipping rod and resting on a detent stop 194 on top of a post 196. The teeth 192 are held in releasable engagement with the detent 194 by means of a spring-loaded slide block 198 mounted to a fixed frame member 200. A handle 202 is provided at one end of the shipping rod by which the operator may lift and shift the shipping rod back and forth lengthwise to any locked position and thereby rotate all of the tubes 58' and their baffles 60' simultaneously to whatever angular position is desired.

Having thus described the invention what I claim and desire to obtain by letters Patent of the United States is:

1. Apparatus for blanching shelled edible nuts, comprising
    a. an endless belt conveyor having a substantially flat horizontal upper surface,
    b. drive means connected to said belt for moving said upper surface in a forward direction,
    c. a plurality of relatively long, straight, flat abrasive baffles extending diagonally across and slightly spaced from said upper surface,
    d. said baffles being disposed in spaced parallel relation to one another with one end of each baffle terminating within the path of said conveyor and forwardly of the other end,
    e. a first pair of parallel tracks extending lengthwise to said belt along each side thereof,
    f. a second pair of parallel tracks rigidly connected to one another in spaced parallel relation, said second tracks disposed parallel to said baffles,
    g. first rollers mounted to said second tracks and riding on said first tracks,
    h. a first lead screw and follower operatively connected to said first and second tracks for moving said second tracks along said first tracks,
    i. a carriage disposed between said first and second tracks,
    j. second rollers mounted to said carriage and riding on said second tracks,
    k. a second lead screw and follower operatively connected to said second tracks and said carriage for moving said carriage along said second tracks,
    l. nut dispensing means mounted to said carriage for delivering individual streams of nuts onto said belt between adjacent baffles,
    m. each of said baffles being mounted for rotation about its longitudinal axis, and,
    n. adjustable actuating means connected to all of said baffles whereby movement of said actuating means will simultaneously adjust all of said baffles to the same angular position.

2. Apparatus according to claim 1 wherein said nut dispensing means includes a single hopper open at its upper end to receive nuts fed therein and a plurality of vibratory feeders mounted below said hopper and communicating therewith, each of said feeders including a horizontal member formed with a plurality of evenly spaced parallel V-shaped channels and arcuate grooves at the bases thereof adapted to register with the spaces between adjacent baffles.

3. Apparatus according to claim 1 including a pair of substantially flat horizontal shields disposed above said baffles and telescopically connected to one another.

4. Apparatus according to claim 1 wherein said actuating means includes an arm fixed to and extending perpendicularly from each of said baffles, an elongated rod extending parallel to the length of said belt and connected to all of said arms, said rod being movably mounted whereby movement of said rod will pivot all of said baffles from one angular position to another.

5. Apparatus according to claim 4 including means for locking said rod in a selected position.

6. Apparatus according to claim 4 wherein said rod is mounted for longitudinal sliding movement and indexing means connected to said rod for locking said rod in any one of a plurality of stop positions.

* * * * *